United States Patent Office 3,167,518
Patented Jan. 26, 1965

3,167,518
ALKYL DIAZABICYCLO-OCTANE CATALYSTS
Adalbert Farkas, Media, Joseph M. Hersh, Newtown Square, and Rocco L. Mascioli, Media, Pa., assignors to Air Products and Chemicals, Inc., a corporation of Delaware
No Drawing. Original application Sept. 8, 1961, Ser. No. 136,750. Divided and this application Jan. 31, 1964, Ser. No. 347,329
3 Claims. (Cl. 252—426)

This application is a division of Serial No. 136,750, filed September 8, 1961.

The present invention relates to tertiary amine catalysts which are liquid below room temperature and over a wide temperature range, said catalysts having high activity in the promotion of the reaction of organic isocyanates with hydroxy compounds and other base-catalyzed reactions, a notable example of which is the synthesis of polyurethanes.

The formation of urethanes by the reaction of organic isocyanates with compounds having an active OH atom, such as alcohols, has long been recognized, e.g.:

Hydroxy-containing acids, esters and amides react similarly with isocyanates to form urethane derivatives. More significantly, linear and cross-linked urethane polymers in the form of elastomers and resins are formed by the reaction of alkyl or aryl diisocyanates or triisocyanates with polyols.

The foregoing type reaction has been successfully and widely utilized in commercial applications for the production of urethane polymers, wherein tertiary amine catalysts have been employed for promoting or initiating the reaction between one or more of the —NCO groups of the organic di- or tri- isocyanates with hydroxyl groups of the organic polyol and/or in promoting the reaction of water with such isocyanates to effect ureide linking of the latter releasing $CO_2$ gas which operation as a blowing agent in the production of cellular polyurethane products.

In earlier processes employing as catalysts such tertiary amines as triethylamine, diethyl ethanolamine, N-ethyl morpholine, the technique for the production of high molecular weight urethane polymers, particularly of the polyglycol ether type, generally involved the initial formation of a prepolymer by reaction of organic diisocyanate with the polyol compound, followed by subsequent introduction of additional isocyanate to effect blowing by reaction with the water in the activator solution containing catalyst and stabilizer. With the introduction of 1,4-diazabicyclo-(2,2,2)-octane (triethylene diamine) as a highly active catalyst for both the urethane (polymerization) and ureide (blowing) reactions (U.S. Patent No. 2,939,851), the production of "one-shot" polyurethane foams of the polyether type was realized on a practical basis.

In the typical production of polyurethane foams using tertiary amine or other catalyst which is solid at room temperature, it is generally necessary for good distribution that the catalyst be introduced as a solution in water or in another liquid which is useful in the polyurethane formulation. Since the quantity of the water or other liquid solvent utilized in the formulation enters into the reactions taking place and thereby effects the characteristics of the polyurethane product obtained, changes in ratio of such liquid to catalyst cannot readily be made at will. Also in substantially anhydrous systems for preparation of non-cellular polyurethanes, such as elastomeric products, and in other systems using limited small quantities of water, such as in those instances in which other gaseous blowing agents (Freon) are utilized, it is desirable from the standpoint of increased processing flexibility to be able to use a catalyst which is in itself a liquid. While certain of the known tertiary amine catalysts heretofore employed or advocated are liquids, these have one or more drawbacks for practical use from the standpoint of catalytic activity, miscibility, volatility, odor, or other considerations; so that the requirement of the polyurethane industry for the desired liquid high activity catalyst has not been heretofore achieved.

An object of the present invention is the provision of catalysts active in polyurethane condensation which are stable, low freezing point liquids fully miscible in at least one of the principal components of a diisocyanate-polyol condensation polymerization system and capable of effecting a "one-shot" polymerization to a rigid or flexible foamed or unfoamed polyurethane polymer.

Another object is to produce a catalytic compound of high activity comparable to that of diazabicyclo-octane, which compound is readily pumpable as a liquid and directly proportionally feedable to a multi-component liquid system for mixing and ejection to form flexible or rigid polyurethanes.

In accordance with the present invention, we have synthesized certain new C-alkyl 1,4-diazabicyclo-(2,2,2)-octanes which are highly active in catalyzing the polymerization of isocyanates and compounds having an active H atom, such as hydroxy compounds, acids, amines, amides, etc., to produce polyurethanes and polyureas. These C-alkyl diazabicyclo-octanes are distinct and unusual in having unexpectedly low melting points enabling them to be incorporated as liquids in essentially pure form in liquid phase reaction systems.

More specifically, we have synthesized 2-methyl-1,4-diazabicyclo-(2,2,2)-octane, a new composition of matter, which is essentially as active as 1,4-diazabicyclo-(2,2,2)-octane in catalyzing isocyanate reactions, yet is a liquid at 0° C. below and can be pumped proportionately directly into a liquid reaction system is essentially pure form in contrast to normally crystalline, high melting (158–160° C.) 1,4-diazabicyclo-(2,2,2)-octane which must be diluted and dissolved before being pumped to a liquid reaction system.

A preferred method of preparing the desired 2-methyl diazabicyclo-octane involves reacting 2-methyl piperazine with an equal molar or larger quantity of ethylene oxide and further cyclo-dehydrating the obtained reaction product in vapor phase over active siliceous cracking catalyst.

In practice of this preferred method, the 2-methyl piperazine is dissolved in an essentially inert organic solvent which is also a solvent for the ethylene oxide. The ethylene oxide may then be admixed with the methyl piperazine solution by introducing the same slowly as a vapor, or in liquid form by precooling. If desired, the ethylene oxide may be pre-dissolved in the same or in another compatible inert organic solvent. Reaction takes place with evolution of heat. The temperature of the reaction can be controlled by regulating the rate of ethylene oxide admixture, and/or keeping the system under reflux and/or by external cooling. The temperature should be kept below 50° C. to avoid loss of reactant; and if lower boiling point volatile solvent is employed, the temperature should be maintained below the boiling point of such solvent. Among the preferred solvents are aromatic hydrocarbons of the benzene series which are normally liquid at room temperature and have a boiling point, at atmospheric or reduced pressure, sufficiently below that of the methyl piperazine to enable their ready separation.

For the second stage of the operation the reaction mixture from which all or most of the solvent may have been removed is passed in vapor phase over the solid siliceous catalyst at a temperature of 325° to 425° C. It is beneficial to have a diluent gas which is inert in the reactant vapors. For this purpose, an inert volatile solvent, nitrogen, or ammonia may be employed; the latter by mass-action effect may tend to curtail the dissociation of amine products with accompanying ammonia formation.

The preferred catalyst is silica-alumina, particularly of the type familiarly used in catalytic cracking of hydrocarbons, in the form of granules, molded pellets, or beads. Such catalysts include the synthetic dried gel type catalyst formed by suitable impregnation of silica gel, or by co-precipitation of alkali metal silicate with an aluminum compound, to provide a gel comprising 60–90% by weight $SiO_2$ to 40–10% by weight $Al_2O_3$ and which may include therein other refractory metal oxides such as magnesia or zirconia. Other known silica-alumina catalysts that may be employed include acid-activated clays of the montmorillonite and kaolin types.

The effluent from the catalytic reaction is then cooled at atmospheric pressure to separate gases and vapors and recover the remaining liquid, which is subjected to fractional distillation to obtain one or more cuts highly concentrated in 2-methyl-1,4-diazabicyclo-(2,2,2)-octane, boiling in the approximate range of 184–185° C.

Instead of reacting ethylene oxide with 2-methyl piperazine, it is also possible to obtain 2-methyl diazabicyclo-octane by the reaction or propylene oxide with piperazine under substantially the conditions set out above. The latter method, however, gives lower yields than those obtained by the ethylene oxide route.

The substantially pure compound can be recovered from the concentrated liquid cut containing the same by conversion to the nitrophenolate, picrate, or other salt complex, separating the insoluble salt crystals obtained and reconstituting the 2-methyl-1,4-diazabicyclo-octane by alkaline splitting.

The unexpectedly low melting point (or the very broad liquid range) of 2-methyl-1,4-diazabicyclo-(2,2,2)-octane can be better appreciated by comparing these two similar diaza-heterocyclic tertiary amines:

|  | 1,4 diazabicyclo-(2,2,2)-octane | 2-methyl-1,4-diazabicyclo-(2,2,2)-octane |
|---|---|---|
|  | 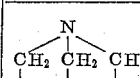 | 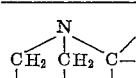 |
| Formula wt. | 112 | 126. |
| Boiling Point, ° C | 174–176 | 184–185. |
| Freezing Point, ° C | 158–160 | Below zero, glass at −70° C. |
| Di-p-nitro-phenolate melting point, ° C | 182–183 | 102–104. |

The profound difference in melting point or liquid range is far more than one would normally anticipate for the substitution of one methyl group on carbon in the bicyclic structure. However, this unusually high liquidity is of very real advantage when 2-methyl-1,4-diazabicyclo-(2.2.2)-octane is used as catalyst in polyurethane systems and especially in non-aqueous systems for the preparation of polyurethane elastomers and rigid foams. The liquid catalyst can be pumped (proportioned) directly to the mixing head of a foam machine, such as the Bayer-Hennecke machine, and mixed instantaneously with the other liquid reactants such as the polyol ether or ester, tolylene diisocyanate, organosilicone foam stabilizer, other emulsifiers, stabilizers, antioxidants, etc., to form foamed or unfoamed products in a simple continuous "one-shot" system. In contrast to this, high melting diazabicyclo-octane crystals must be dissolved in water and the polyol for foamed products, and (with considerably more difficulty) in the polyol or diisocyanate alone in non-aqueous unfoamed systems. The methylated liquid product is also notably easier to prepare in color-free form; it retains its colorless state and does not depreciate in storage. Crystalline diazabicyclo-octane is, as noted in U.S. Patent No. 2,937,176 to Herrick, an extremely hydroscopic solid which, with a small amount of water, tends to become sticky and form a solid cake in its container. Such a moisture-caked product must be scraped, chipped, or melted out of the container and thereby carries with it a difficultly determined amount of water as an impurity. The crystalline product requires extensive washing and recrystallization or even sublimation to produce a clean, white, easy-flowing solid as is demanded by the trade. Crystalline diazabicyclo-octane, when accompanied by small amounts of other amino-compounds as impurities, is prone to go off-color in ordinary storage unless suitable precautions in packaging and stabilization are observed.

EXAMPLE I 250 parts by weight of ethylene oxide (5.7 moles) were added by bubbling of this gas into a solution of 447 parts by weight of 2-methyl piperazine (4.5 moles) in 415 parts by weight of benzene, over about 8 hours with a notable evolution of heat to a temperature of 45–50° C. The benzene solvent was then largely removed down to 34 parts by weight, by holding the reaction mixture under reduced pressure (8 hr. at 30 mm. Hg). This reaction product was then passed over commercial activated kaolin catalyst (prepared in accordance with U.S. Patent No. 2,904,520) in vapor phase in the presence of ammonia, using 35 parts by weight of $NH_3$ per 100 parts by weight of the above product. A total of 610 parts by weight of the above liquid product were charged to the reactor at 0.8 LHSV and 340–345° C. 605 parts by weight were recovered as liquid product, or 98.8% recovery.

The reactor effluent, 605 parts by weight, were fractionated in a 50 plate column at a 50/1 reflux ratio. The principal distillation cuts, their weights and analyses by mass spectrometer follow:

Table 1

| Cut No. | 4 | 5 | 6 | 7 | 8 | 9 | 10 | 11 | 12 | 13 | 14 | 15 | 16 |
|---|---|---|---|---|---|---|---|---|---|---|---|---|---|
| Wt. (g.) | 5 | 6 | 11 | 5 | 6 | 10 | 15 | 29 | 44 | 36 | 24 | 22 | 28 |
| Boiling Range, °C | 165–170 | 170–175 | 175–179 | 179–180 | 180–181 | 181–182 | 182–183 | 183–184 | 184–184.5 | 184–182 | 182–180 | 180–182 | 182–215 |
| M.S. Analysis, percent |  |  |  |  |  |  |  |  |  |  |  |  |  |
| Methyl-diazabicyclo-octane | 19.6 | 41.5 | 55.4 | 63.9 | 70.9 | 77.9 | 86.3 | 92.7 | 96.5 | 95.4 | 95.8 | 92.2 | 78.5 |
| Diazabicyclo-octane | 16.3 | 18.0 | 17.0 | 14.1 | 12.6 | 9.7 | 6.1 | 2.4 | 0.4 |  |  |  | 0.3 |
| Methyl-ethyl pyrazine | 16.8 | 16.7 | 14.0 | 10.8 | 9.1 | 6.7 | 3.7 | 1.2 |  |  |  |  | 4.1 |
| Methyl-ethyl piperazine | 20.3 | 15.9 | 9.4 | 5.7 | 4.4 | 2.6 | 1.5 | 0.4 |  | 0.9 | 2.1 |  | 0.2 |
| Alkyl pyrazines | 1.3 | 0.6 | 0.6 | 0.7 | 0.7 | 0.9 | 0.9 | 1.0 | 1.2 | 0.9 | 2.1 | 3.3 | 7.1 |
| Alkyl piperazines | 9.9 | 4.7 | 2.1 | 3.7 | 1.4 | 0.5 | 0.7 | 1.9 | 0.7 | 2.2 | 0.9 | 2.0 | 1.5 |
| Alkyl diazabicyclo-octanes | 0.4 | 0.2 | 1.2 | 1.1 | 0.9 | 1.0 | 0.4 | 0.4 | 1.2 | 1.5 | 3.0 | 2.5 | 6.5 |
| Water | 2.2 |  |  |  |  |  |  |  |  |  |  |  |  |

The yield of methyl-diazabicyclo-octane computed from the content of each of the listed cuts gives a total yield of methyl-diazabicyclo-octane based on the methyl-piperazine charge of 36 weight percent. Fractionated cuts were used to carry out characterization, analytical and catalytic tests. The results on these tests are as follows:

2-methyl-1,4-diazabicyclo-(2,2,2)-octane

| | |
|---|---|
| Boiling pt., °C | 184–185° C. |
| Freezing pt., °C | Indefinite; liquid at 0° C.; glassy at −70 to −80° C. (alcohol-Dry Ice bath). |
| Mass by M.S. | Found 126; theory 126. |
| Refractive index, $n\ 20/D$ | 1.4789. |
| Infra-red absorption pattern | Compares closely with diazabicyclo-octane pattern. |
| Chromatographic[1] purification | Gave a water-white liquid amine odor, further identified by M.S. as 99.6% methyldiazabicyclo-octane. |

Percent Nitrogen:

| | Found | Theory |
|---|---|---|
| Cut #12 | 22.1 | 22.2 |
| Cut #13 | 22.5 | 22.2 |
| Cut #14 | 22.1 | 22.2 |

Titration with standard acid $pK_1$, 3.15; $pK_2$, 8.86. indicated dibasic form.
Di-p. nitro-phenolate m.pt., 102–104. °C.

[1] "Nalcamine G-12," identified as a mixture of 1-(2-hydroxyethyl)-2-heptadecenyl- and 2-heptadeca-dienyl-2-imidazolines on "Chromosorb," an adsorbent diatomaceous earth.

By physical and chemical tests the product synthesized is identified as 2-methyl-1,4-diazabicyclo-(2,2,2)-octane and is represented by the formula:

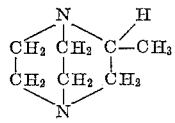

EXAMPLE II

Commercial tertiary amine catalysts for polyurethanes have been compared with diazabicyclo-octane by the Wolfe method (Du Pont "Foam Bulletin," March 16, 1960, by H. W. Wolfe, Jr.) involving the following tests:

(A) Tolylene diisocyanate is reacted with water in the presence of a catalyst or combination of catalysts. A reaction rate is determined by measuring the rate of $CO_2$ evolution as a function of time:

*Amine catalysts at equi-molar conc.*

| | c.c. $CO_2$/ 15 sec. | Time, sec. to max. $CO_2$ | Activity Order[1] |
|---|---|---|---|
| 1,4-diazabicyclo-(2, 2, 2)-octane | 88 | 45 | 3.9 |
| Tetramethyl ethylene diamine | 46 | 45 | 2.1 |
| Triethyl amine | 35 | 30 | 1.6 |
| N-methyl morpholine | 24 | 40 | 1.2 |
| N-ethyl morpholine | 22 | 45 | 1.0 |

[1] Compared to stannous octoate =1.0.

(B) Tolylene diisocyanate is reacted with a polypropylene ether glycol of 1000 mol. wt. in a 2/1 molar ratio in the presence of a catalyst in an adiabatic system. The urethane reaction rate is measured in temperature increase and viscosity increase as a function of reaction time.

*Amine catalysts in the urethane reaction order of reactivity*

| | |
|---|---|
| Uncatalyzed | 1 |
| 0.1% N-ethyl morpholine | 11 |
| 0.1% triethyl amine | 24 |
| 0.1% tetramethyl ethylene diamine | 56 |
| 0.1% 1,4-diazabicyclo-(2,2,2)-octane | 130 |
| 0.5 N-ethyl morpholine | 22 |
| 0.5 triethyl amine | 74 |
| 0.5 tetramethyl ethylene diamine | 160 |
| 0.5 1,4-diazabicyclo-(2,2,2)-octane | 390 |

In terms of these tests diazabicyclo-octane is far superior to the reference commercial catalysts.

EXAMPLE III

In a similar procedure, 2-methyl-1,4-diazabicyclo-(2,2,2)-octane and 1,4-diazabicyclo-(2,2,2)-octane have been compared in reaction rate studies:

| | Relative Reaction Rates in— | |
|---|---|---|
| | Isocyanate-hydroxyl Reaction | Isocyanate-water Reaction |
| 2-methyl-1, 4-diazabicyclo-(2, 2, 2)-octane (90% pure cut) | 164 | 2.2 |
| 1, 4-diazabicyclo-(2, 2, 2)-octane | 182 | 2.6 |
| 2-methyl-1, 4-diazabicylo-(2, 2, 2)-octane (calculated to 100%) | 180 | 2.4 |

By comparison, methyl-1,4-diazabicyclo-(2,2,2)-octane is substantially equivalent in activity to 1,4-diazabicyclo-(2,2,2)-octane and can be used in a highly concentrated form, but need not be of 99+% purity. At the same time, by comparison, it is far superior to other tertiary amines (other than 1,4-diazabicyclo-(2,2,2)-octane).

EXAMPLE IV

Methyl-1,4-diazabicyclo-(2,2,2)-octane, and 1,4-diazabicyclo-(2,2,2)-octane, respectively, were used as the polymerization catalyst in small scale polyurethane foam preparations, i.e., so-called "hand mixes," in each case, a polyol mixture was made up in the ratio of:

| | Parts by wt. |
|---|---|
| Glycerine polypropylene-oxide adduct [triol] 3000 M.W., 56 Hydroxyl No. (LG 56) | 100 |
| Polypropylene glycol [diol] 2025 M.W., 55 Hydroxyl No. (PPG 2025) | 100 |
| Organo silicone (L–520) | 2 |

To an aliquot part of this polyol mix a solution of catalyst in water was added and then tolylene diisocyanate, as shown below. Mixing was continued by manual agitation until the mixture "creamed." It was then poured out into 12" x 13" forms and allowed to rise with autogenic blowing. Rise time and the general quality of the foamed product were noted, as follows:

| | #1 | #2 |
|---|---|---|
| Catalyst | Methyl-1,4-diazabicyclo-(2,2,2)-octane[1] | 1,4-diazabicyclo-(2,2,2)-octane |
| Components, by weight: | | |
| Polyol mix | 300 | 300 |
| Catalyst | 1.5 | 1.5 |
| Water | 9.0 | 9.0 |
| Tolylene diisocyanate | 114 | 114 |
| Cream time, seconds | 30–35 | 20 |
| Set time, minutes (max. foam) | 2.5 | 2.0 |
| Foam height, inches | 3.0–3.5 | 3.5–3.75 |
| Foam nature | (2) | (2) |

[1] Methyl-1,4-diazabicyclo-(2,2,2)-octane composition of:
89% methyl-1,4-diazabicyclo-(2,2,2)-octane
4% other alkyl 1,4-diazabicyclo-(2,2,2)-octanes
2% 1,4-diazabicyclo-(2,2,2)-octane
5% alkyl pyrazines and piperazines
[2] Soft, flexible.

Methyl-1,4-diazabicyclo-(2,2,2)-octane at 89% purity used in equivalent weight with 1,4-diazabicyclo-(2,2,2)-octane was slightly slower to cream, rise and set, but in a practical sense was essentially equivalent to 1,4-diazabicyclo-(2,2,2)-octane in foam formation.

EXAMPLE V

Methyl-1,4-diazabicyclo-(2,2,2)-octane and 1,4-diazabicyclo-(2,2,2)-octane were both used under similar conditions in foam machine runs using the Bayer-Hennecke machine. The components were pumped to the mixing head, mixed and ejected as a creamy mix in the conventional manner. In the runs using crystalline 1,4-diazabicyclo-(2,2,2)-octane, the catalyst and tin soap were first dissolved in the designated amount of water and this activator solution fed to the machine as one component. Foamed polyurethanes of good quality were made with both 1,4-diazabicyclo-(2,2,2)-octane and methyl-1,4-diazabicyclo-(2,2,2)-octane.

For example, a run made by passing the reaction product of 2-methyl piperazine and ethylene oxide (including 66% benzene solvent) over activated kaolin catalyst at 0.8 space rate and 365–371° C. gave a 97.3% liquid product recovery. The reactor effluent fractionated as in Example I gave high concentrations of methyl-1,4-diazabicyclo-

*Foam machine runs*

Components parts by wt.:
Polypropylene glycol 4000 M.W., 28 Hydroxyl No. (CP 4000) _____ 100
Tolylene diisocyanate mixed isomer (Hylene TM) __ 45.8
Water _____ 4.0
Organo-silicone (L-520) _____ 1.0
Catalyst _____ 0.15
Stabilizer (tin octoate) _____ 0.57

Conditions:
Throughput, lb./min. _____ 20
Mixer type _____ Multi-pin
Mixer, r.p.m. _____ 5000
Nozzle extension, mm. _____ 220.115
Temperature, ° F. _____ 75

| | 1,4-diazabicyclo-(2,2,2)-octane | | | | Methyl-1,4-diazabicyclo-(2,2,2)-octane [1] | | |
|---|---|---|---|---|---|---|---|
| Cream time, secs. | 9 | 7 | 7 | 7 | 7 | 7 | 7. |
| Rise time, secs. | 55 | 55 | 53 | 52 | 54 | 55 | 55. |
| Aging treat | As received | | Humid aged, 5 hr., 211° F., 100% Steam. | Heat aged, 24 hr., 285° F., Amb. H. | As received | Humid aged, 5 hr., 212° F., 100% Steam. | Heat aged, 24 hr., 285° F., Amb. H. |

[1] 95.6% methyl-1,4-diazabicyclo-(2,2,2)-octane by M.S. analysis (cut at 183 to 184.5° C.)

| Physical Tests (2 sample average) | 1,4-diazabicyclo-(2,2,2)-octane | | | Methyl-1,4-diazabicyclo-(2,2,2)-octae | | |
|---|---|---|---|---|---|---|
| | As Rec'd | Humid Aged | Heat Aged | As Rec'd | Humid Aged | Heat Aged |
| Density, lb./ft.³ | 1.6 | 1.5 | 1.6 | 1.6 | 1.5 | 1.5 |
| Compression Deflection, 25 percent | 0.37 | 0.36 | 0.30 | 0.37 | 0.33 | 0.35 |
| Tensile, lb./in.² | 13.0 | 13.1 | 9.5 | 12.8 | 10.3 | 10.2 |
| Elongation, Percent | 135 | 190 | 85 | 155 | 130 | 90 |
| Tear, lb./in.² | 2.0 | 1.8 | 0.7 | 1.65 | 1.1 | 1.1 |
| Compression set: | | | | | | |
| 50% | 10.7 | 7.9 | 5.9 | 10.5 | 9.8 | 8.1 |
| 90% | 13.3 | 9.7 | 10.8 | 16.4 | 11.4 | 9.1 |
| Resilience, Percent | 27 | | | 36 | | |
| Load Deflection: | | | | | | |
| 25% | 30.5 | | | 32.5 | | |
| 50% | 50.5 | | | 52.8 | | |
| 65% | 69.2 | | | 69.0 | | |
| 75% | 93 | | | 102 | | |

These two runs show that methyl-1,4-diazabicyclo-(2,2,2)-octane and 1,4-diazabicyclo-(2,2,2)-octane are of equal effect as catalysts and may be used interchangeably as such, but further emphasize the greater flexibility of the system using liquid methyl-1,4-diazabicyclo-(2,2,2)-octane, wherein the concentration of liquid methyl-1,4-diazabicyclo-(2,2,2)-octane in the foam mix can be changed with each run or even during a run simply by changing pump settings without changing the water, activator or polyol ratios at the same time—as would be the case with prepared aqueous-polyol solutions of 1,4-diazabicyclo-(2,2,2)-octane catalyst.

The unique advantage of a liquid catalyst such as methyl-1,4-diazabicyclo-(2,2,2)-octane over a solid catalyst was further demonstrated in the preparation of non-foamed polyurethane elastomers, where water (which usually acts as the solvent for the solid catalyst) is avoided. Similar elastomer formulations made with 1,4-diazabicyclo-(2,2,2)-octane and with methyl-1,4-diazabicyclo-(2,2,2)-octane, respectively, subjected to curing under the same conditions, each showed high tensile strength in the order of about 3000 p.s.i. and acceptable Shore hardness and elongation. A control sample made with triethyl amine had a tensile strength of about 400 p.s.i.

EXAMPLE VI

A preferred method of synthesis of methyl-1,4-diazabicyclo-(2,2,2)-octane is given in Example I above, similar syntheses starting with 2-methyl piperazine have been made satisfactorily under somewhat different conditions.

(2,2,2)-octane as in Example I. The cut boiling in the 185–186° C. range was 89% methyl-1,4-diazabicyclo-(2,2,2)-octane by mass spectrometric analysis.

Alternative methods of synthesizing methyl-1,4-diazabicyclo-(2,2,2)-octane have been demonstrated. For example, piperazine and propylene oxide have been reacted in benzene solution and the mixture passed over activated kaolin catalyst at (a) 1.2 space velocity at 354–370° C. and (b) at 1.0 space rate at 365–379° C. with good recoveries of liquid product from which cuts rich in methyl-1,4-diazabicyclo-(2,2,2)-octane were obtained in each case by careful fractionation. Neither the concentrations of methyl-1,4-diazabicyclo-(2,2,2)-octane in the reactor effluent nor the overall yields were as good under these conditions as in Example I.

An interesting and unusual syntheses of 2-methyl-1,4-diazabicyclo-(2,2,2)-octane has been effected from alkylene diamines and alkylene oxides (A) directly and (B) after cyclodehydration in the presence of organic acids, with the product from (A) or (B) passed over cracking catalyst as in Example I.

EXAMPLE VII (A) 323 parts (4.37 moles) of 1,2-diamino propane and 343 parts (7.79 moles) of ethylene oxide were reacted with external cooling at 25°–40° C. The reaction product was then passed over activated kaolin catalyst with ammonia under the following conditions:

| | | |
|---|---|---|
| LHSV | 0.42 | 0.40 |
| Temperature, °C | 340–350 | 365–368 |
| Wt. NH₃/charge | 0.61 | 0.63 |
| Liquid recovery, percent | 97.4 | 97.4 |
| Wt. charge, parts | 195 | 157 |
| Stabilized product (flash distillate) | 85 | 85 |
| Methyl-1,4-diazabicyclo-(2,2,2)-octane in distillate, percent | 45.1 | 44.6 |
| Methyl-1,4-diazabicyclo-(2,2,2)-octane in effluent, percent | 20.1 | 24.7 |
| Methyl-1,4-diazabicyclo-(2,2,2)-octane based on charge, percent | 19.6 | 24.1 |

By fractionation of the stabilized distillate there is recovered at 182–185° C. an 85+% 2-methyl-1,4-diazabicyclo-(2,2,2)-octane concentrate.

(B) 1,2-diamino propane was reacted respectively with 2 moles and 3 moles of ethylene oxide at temperatures below 40° C. The reaction effluent in each case, which contained as the primary addition products, respectively, bis-hydroxyethyl- and tris-hydroxyethyl propane diamine-1,2, were reacted with acetic acid and heated to drive off water, then passed over acidic cracking catalyst to form 2-methyl-1,4-diazabicyclo-(2,2,2)-octane in substantial yields:

|  | 2 moles ethylene oxide | 3 moles ethylene oxide |
|---|---|---|
| Propane diamine, parts by wt | 509 | 657 |
| Glacial acetic acid, parts by wt | 30.5 | 39.4 |
| Temperature, °C | 235 | 210–235 |
| Time at temperature, hr | 9 | 1.5 |
| Water removed, parts by wt | 45 | 56 |
| Cyclo-dehydration catalyst (second) | Kaolin | Kaolin |
| Cyclo-dehydration temperature, °C | 343–349 | 349–353 |
| Cyclo-dehydration LHSV | 0.6 | 0.5 |
| NH₃/feed ratio | 0.4 | 0.3 |
| Liquid recovery, percent | 99 | 100 |
| Liquid effluent comp. by M.S., percent: |  |  |
| Methyl-1,4-diazabicyclo-(2,2,2)-octane | 22.0 | 22.4 |
| 1,4-diazabicyclo-(2,2,2)-octane | 1.1 | 2.3 |
| Dimethyl-1,4-diazabicyclo-(2,2,2)-octane | 0.6 | 0.5 |
| Yield of methyl-1,4-diazabicyclo-(2,2,2)-octane on propane-diamine, percent | 19.0 | 20.4 |
| Stabilized liquid, reac. effluent | 315 | 256 |
| Flash distillate: |  |  |
| Cut #1 162–182° C. parts by wt | ¹ 74 | 91.5 |
| Percent Methyl-1,4-diazabicyclo-(2,2,2)-octane, M.S. | 48.3 | 62.8 |
| Cut #2 182–200° C. parts by wt | 49 |  |
| Percent Methyl-1,4-diazabicyclo-(2,2,2)-octane, M.S. | 62.6 |  |
| Total methyl-1,4-diazabicyclo-(2,2,2)-octane in 2 cuts, percent | 54 |  |
| Yield methyl-1,4-diazabicyclo-(2,2,2)-octane on effluent, percent | 21 | 22.4 |

¹ 165–190° C.

These methyl-1,4-diazabicyclo-(2,2,2)-octane concentrates were fractionally distilled to recover a 97.5% methyl-1,4-diazabicyclo-(2,2,2)-octane product boiling in the range of 184–185° C.

Catalyst compositions comprising solutions of up to 13 parts of 1,4-diazabicyclo-(2,2,2)-octane in 100 parts of 2-methyl-1,4-diazabicyclo-(2,2,2)-octane have the advantage of low freezing point, being liquid at 0° C., while retaining high activity in polyurethane and related polymerizations. The normally liquid fractions obtained by synthesis, containing a minor amount of 1,4-diazabicyclo-(2,2,2)-octane in association with at least 6 parts of methyl-1,4-diazabicyclo-(2,2,2)-octane, need not be refined to their ultimate purity, but may be used in that form as the desired low temperature stable liquid catalyst combination.

The invention has thus far described the synthesis of a specific new compound, 2-methyl-1,4-diazabicyclo-(2,2,2)-octane, and its physico-chemical characteristics which make it an outstanding catalyst in urethane polymerization systems. By substituting one methyl group for hydrogen in 1,4-diazabicyclo-(2,2,2)-octane, the freezing point was lowered drastically from 160° C. to below 0° C. without adversely affecting the catalytic properties of the 1,4-diazabicyclo-(2,2,2)-octane structure. It is quite evident, however, from Examples I, IV, and VII above, that small amounts of closely related C-alkyl diazabicyclo-compounds are formed congenerically in the synthesis and may be present in the product. Such closely related congeners present in minor amounts are not undesirable and, in fact, may contribute to the overall activity of the principal product. Dimethyl-diazabicyclo-(2,2,2)-octane has, in fact, been synthesized largely following the method of Example I and has been found to possess high catalytic activity at the level approaching that of methyl-1,4-diazabicyclo-(2,2,2)-octane and 1,4-diazabicyclo-(2,2,2)-octane.

EXAMPLE VIII

To 180 parts of 2,5-dimethyl-piperazine dissolved in 445 parts of benzene, 79 parts of ethylene oxide were added slowly with cooling to overcome the exothermic reaction on addition. The reaction mixture (containing roughly 65% of benzene acting as a diluent) was passed over kaolin in a packed reaction chamber at 365–370° C. at 0.8 LHSV. Liquid product recovery was 99%. The liquid reactor effluent was fractionally distilled at reduced pressure (100 mm. Hg) to recover dimethyl-1,4-diazabicyclo-(2,2,2)-octane and related products. Cuts 7 and 8 of the fractionation, collected at 125–126° C., were richest in dimethyl-1,4-diazabicyclo-(2,2,2)-octane and had the following composition by mass spectrometric analysis:

| Cut Number | 7 | 8 |
|---|---|---|
| Boiling Point, °C./100 mm | 125 | 126 |
| Weight ratio | 22 | 7 |
| Composition: |  |  |
| Dimethyl-1,4-diazabicyclo-(2,2,2)-octane | 90.7 | 92.4 |
| 1,4-diazabicyclo-(2,2,2)-octane | 0.9 | 0.7 |
| Methyl-ethyl-1,4-diazabicyclo-(2,2,2)-octane | 0.9 | 0.9 |
| Alkyl piperazines | 1.2 | 0.9 |
| Alkyl pyrazines | 6.3 | 3.7 |
| Mol. wt. by mass spectrometer | 140 |  |
| Boiling Point °C./100 mm. Hg | 125–126 |  |
| Freezing Point, glassy | (¹) |  |
| Ultimate analysis, percent nitrogen | 10.1 | 19.9 |
| Theoretical | 20.0 |  |

¹ Below −20° C.

Based upon 2,5-dimethyl piperazine as the starting material, the product synthesized is identified as 2,5-dimethyl-1,4-diazabicyclo-(2,2,2)-octane:

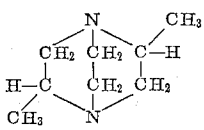

In foaming test runs the composite of Cuts 7 and 8, consisting 91% of 2,5-dimethyl-1,4-diazabicyclo-(2,2,2)-octane shows roughly 90% of the catalytic activity shown by 1,4-diazabicyclo-(2,2,2)-octane alone.

It is to be noted in this synthesis that the charge fed to the reactor at 365–370° C. was diluted with benzene in a ratio of about 4 moles of benzene per mole of active ingredient (ethylene oxide-dimethyl piperazine adduct). Benzene acts here as a diluent having somewhat the effect of the ammonia charged with the reactants in Example I. Other unreactive hydrocarbons or inert gases could as well be used, such as nitrogen, n-heptane, toluene or xylene instead of ammonia and/or benzene.

The dehydrocyclizations effected over siliceous acidic catalysts as in Examples I, VII and VIII are generally carried out in the range of 325° C. to 425° C., but preferably at about 370° C. At higher temperatures the quantity of alkyl pyrazines increases undesirably, while at lower temperatures conversions are low and product yields are accordingly uneconomic. Carrying out the dehydrocyclization at lower space rates (longer contact time) tends to produce more pyrazines and higher polymeric amines. Space rates in the range of 0.5 to 2.0 are preferred.

In the synthesis method described in Example VII the initial reaction of the alkylene oxide with the alkylene diamine leads to the formation of mixed hydroxyalkylated alkylene polyamines containing 1 to 2 hydroxyalkyl groups attached to either or both nitrogens. This intermediate can be reacted with acetic acid and heated to drive off water, as described in the example, thereby effecting initial cyclodehydration to obtain 2-methyl piperazine derivatives having hydroxy alkyl groups attached to either or both of the hetero-nitrogen atoms. It is therefore evident that these intermediates can be employed as starting compounds for preparation of methyl and dimethyl diazabicyclo-octanes by reaction over active solid cracking catalyst in the manner above described. As such intermediates there comes into consideration particularly 1-hydroxyethyl-3-methyl piperazine and 1-hydroxyethyl-2-methyl piperazine and 1,4-bishydroxyethyl-2 methyl piperazine.

As already indicated above, as starting materials for synthesizing methyl and dimethyl derivatives of diazabicyclo-octane, hydroxyalkylated propylene diamines can be employed; preferred examples of such starting materials are: bishydroxyethyl propylene diamine-1,2; bis-betahydroxy propylethylene diamine; and bis-betahydroxy propyl diethylene triamine. Ring closure to the dicyclic compounds can be effected directly over solid acidic cracking catalyst (Example VIIA) or by first forming the monocyclic derivative by cyclodehydration with acetic or other strong acid passing the obtained reaction products over the solid cracking catalyst (Example VIIB).

An alternative route leading to the production of methyl derivatives of diazabicyclo-octane involves the reaction of ethylene diamine or alkylene polyamine (e.g., diethylene triamine) with 1,2-diamino propane, effected at temperatures in the range of 325–425° C. over solid siliceous cracking catalysts of the type described above.

EXAMPLE IX

Propylene diamine-1,2 and diethylene triamine were mixed in equal molar quantities and charged to a fixed bed reactor containing activated kaolin catalyst at a space rate of approximately 1 (LHSV) over a three hour period and at an averaged bed temperature of about 363° C. The liquid product recovered from the reaction effluent was 74.3% by weight of charge. The presence of diazabicyclo-octane and of methyl-diazabicyclo-octane was confirmed by MS analysis. To the liquid product there was added an equal amount (by weight) of diethyl benzene and the mixture distilled. A cut made at 146 to 167° C. solidified in the condenser and consisted chiefly of diazabicyclo-octane. A cut collected over the range 176–185° C. contained most of the methyl diazabicyclo-octane produced.

The new catalyst compositions comprising mono- and/or dimethyl-1,4-diazabicyclo-(2,2,2)-octane are effective not only in isocyanate reactions with hydroxy compounds and water, but also in isocyanate and isothiocyanate (a) polymerization to cyclic dimers, trimers and higher polymeric resins, (b) reactions with active hydrogen atoms as in primary and secondary amines, amides, carboxylic acid, aldehydes, ketones and their thio-analogs, such as mercaptans, thio-acids, thio-acetals, and the like.

The new liquid catalyst compositions comprising methyl and/or dimethyl diazabicyclo-octane thus, are also useful, for example, in curing of epoxy resins, in trans-esterification and cyano-ethylation reactions, and in promoting condensation reactions of the type represented by acetal, aldol and aceto-acetic ester condensations. Because of the presence of the methyl group these compounds are useful as intermediates for the production of the corresponding oxygenated and halogenated derivatives of diazobicyclo-octane containing the groups —$CH_2OH$, —COOH, —CHO, —$CH_2X$ (X=halogen) in the 2 position.

Obviously many modifications and variations of the present invention as hereinbefore set forth may be made without departing from the spirit and scope thereof and therefore only such limitations should be imposed as are indicated in the appended claims.

What is claimed is:

1. Liquid catalyst composition active in polyurethane synthesis comprising a solution of 1,4-diazabicyclo-(2,2,2)-octane in 2 - methyl - 1,4 - diazabicyclo-(2,2,2)-octane.

2. Anhydrous liquid catalyst mixtures comprising as active catalytic components therein 2-methyl-1,4-diazabicyclo-(2,2,2)-octane and a minor quantity of 1,4-diazabicyclo-(2,2,2)-octane.

3. An active catalytic composition comprising at least two compounds of the group consisting of 1,4-diazabicyclo-(2,2,2)-octane, 2 - methyl-1,4-diazabicyclo-(2,2,2)-octane and 2,5-dimethyl-1,4-diazabicyclo-(2,2,2)-octane said composition being liquid at ambient temperatures and having a freezing point below 0° C.

No references cited.

TOBIAS E. LEVOW, *Primary Examiner.*

UNITED STATES PATENT OFFICE
CERTIFICATE OF CORRECTION

Patent No. 3,167,518 January 26, 1965

Adalbert Farkas et al.

It is hereby certified that error appears in the above numbered patent requiring correction and that the said Letters Patent should read as corrected below.

Column 1, line 40, for "operation" read -- operates --; column 2, line 29, for "distanct" read -- distinct --; line 37, for "at 0° C. below" read -- at 0° C. and below --; line 38, for "is" read -- in --; same column 2, line 58, for "and/or" read -- and/or by --; column 4, line 2, for "structure," read -- structure.--; line 22, for "hydroscopic" read -- hygroscopic --; columns 7 and 8, in the table, under the heading "1,4-diazabicyclo-(2,2,2)-octane", third column thereof, for "Humid aged, 5 hr., 211° F., 100% Steam." read -- Humid aged, 5 hr., 212° F., 100% Steam. --; column 8, line 32, after "have" insert -- also --; column 10, in the table, second column, line 11 thereof, for "10.1" read -- 20.1 --.

Signed and sealed this 17th day of August 1965.

(SEAL)
Attest:

ERNEST W. SWIDER
Attesting Officer

EDWARD J. BRENNER
Commissioner of Patents